H. H. ELWELL,
Assignor to THE NORWALK LOCK CO.
Key.
No. 8,984. Reissued Dec. 2, 1879.
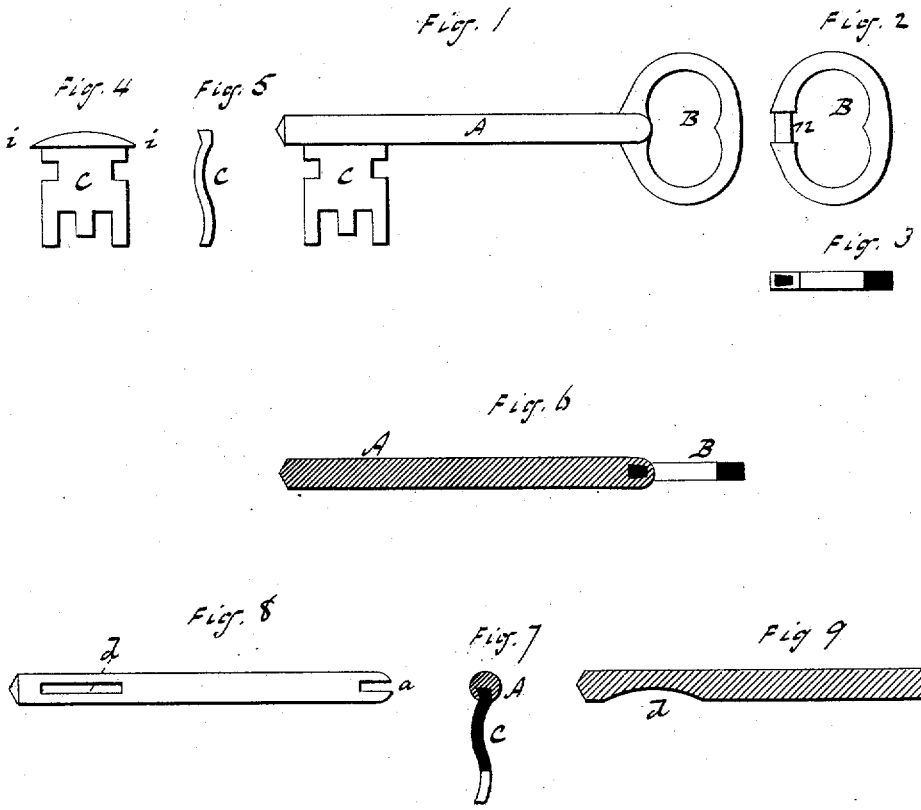
Witnesses.
J. H. Murray
Jos. C. Earle
Henry H. Elwell
Inventor.
By atty.
Wm. E. Earle
N. PETERS, PHOTO-LITHOGRAPHER, WASHINGTON, D. C.

UNITED STATES PATENT OFFICE.

HENRY H. ELWELL, OF SOUTH NORWALK, ASSIGNOR TO THE NORWALK LOCK COMPANY, OF NORWALK, CONNECTICUT.

IMPROVEMENT IN KEYS.

Specification forming part of Letters Patent No. 108,466, dated October 18, 1870; Reissue No. 8,984, dated December 2, 1879; application filed September 19, 1879.

*To all whom it may concern:*

Be it known that I, HENRY H. ELWELL, of South Norwalk, in the county of Fairfield and State of Connecticut, have invented a new Improvement in Door-Keys; and I do hereby declare the following, when taken in connection with the accompanying drawings and the letters of reference marked thereon, to be a full, clear, and exact description of the same, and which said drawings constitute part of this specification, and represent, in—

Figure 1, a side view of the key complete; Figs. 2 to 9, inclusive, detached views to illustrate the construction.

This invention relates to an improvement in door-keys; and it consists in the construction as hereinafter described, and particularly recited in the claim.

A is the spindle of the key. B is the bow, and C the bit, both constructed from sheet-steel or other suitable material. In the end of the spindle a slot, *a*, is formed, as seen in Fig. 8, and a groove, *d*, is cut near the other end, as seen in Figs. 8 and 9.

The upper edge of the bit, which is to be introduced into the groove in the spindle, is made thicker or enlarged transversely so as to be thicker above than at the surface-line of the spindle, as seen in Fig. 5, and so that when this enlarged portion is inserted into the groove and the metal of the spindle closed over said enlargement, as seen in Fig. 7, the bit is secured in the spindle.

The ends *i* of the bit may project so that the metal of the spindle may be struck into or over such projection. For convenience of inserting the bit, I open the groove, and this prevents the closing of the spindle upon the enlargement of the bit from changing the diameter or shape of the spindle at any point.

In the bow that portion, *n*, which corresponds to the slot in the end of the spindle (seen in Figs. 2 and 3) is made of dovetail form, so that when set into the end of the spindle, as seen in Fig. 6, the end of the spindle may be closed onto the bow sufficiently to firmly hold the bow and make it, like the bit, practically of one and the same piece with the spindle.

The shape of the groove for the insertion of the bit may be varied, it only being required that it shall be of such shape that when closed over the enlargement of the bit it will hold the bit in place, and the same may be said in regard to the bow. By this construction a very light, simple, and cheap key is produced.

I do not wish to be understood as broadly claiming the construction of a key in which the bit and bow are formed independent of the spindle and attached thereto by soldering or riveting.

I claim as my invention—

In a key, the spindle constructed with a groove at the bit end, combined with a bit constructed with a transverse enlargement at its spindle-edge, and permanently secured in the groove of the spindle by means substantially as described.

HENRY H. ELWELL.

Witnesses:
DAVID E. DISBROW,
R. C. AMBLER.